June 13, 1944.  A. M. MARKS  2,351,058
IMPRESSER MECHANISM
Filed Nov. 9, 1940  3 Sheets-Sheet 1

INVENTOR
Alvin M. Marks
BY Orville N. Greene
ATTORNEY

June 13, 1944.   A. M. MARKS   2,351,058
IMPRESSER MECHANISM
Filed Nov. 9, 1940   3 Sheets-Sheet 3

INVENTOR
Alvin M. Marks
BY Orville N Greene
ATTORNEY

Patented June 13, 1944

2,351,058

UNITED STATES PATENT OFFICE 2,351,058

IMPRESSER MECHANISM

Alvin M. Marks, Beechhurst, N. Y.

Application November 9, 1940, Serial No. 364,985

7 Claims. (Cl. 154—1)

My invention relates to a novel impresser mechanism and more specifically my invention relates to a multiple impressing apparatus adapted to effect transfer of a crystalline layer from crystalline master blanks to receptive media.

In my copending application Serial No. 313,392, filed January 11, 1940, I have disclosed a novel method for forming crystalline layers such as polarizing iodocinchonidine sulphate crystals by transferring a crystalline field in the form of a layer from a crystalline master blank which may be formed in accordance with my Patents Nos. 2,104,949 and 2,199,227, to a receptive plastic medium by impressing the crystal face of said master blank against said receptive plastic medium.

This transfer is preferably effected under conditions of high vacuum, high pressure and raised temperature.

I have now devised a novel apparatus for simultaneously effecting the multiple transfer of such crystalline layers from a plurality of master blanks to a receptive plastic medium, my apparatus being specifically devised to provide the proper conditions of low surrounding atmospheric pressure, the desirable temperature conditions and the necessary pressures to effect the transfer. My apparatus is so devised that the cycle of operations which will be hereinafter more specifically described is effected automatically, the machine returning to its original position at the end of the cycle.

It is the object of my invention to provide a novel impresser apparatus.

It is a further object of my invention to provide a novel impresser apparatus for effecting the transfer of crystalline fields.

It is a further object of my invention to provide a novel apparatus for effecting the transfer of a crystalline field in the form of a layer from a master blank to a receptive plastic medium in the presence of a substantial vacuum at elevated temperature and under relatively high pressure.

It is a further object of my invention to provide a novel apparatus for effecting the transfer of a crystalline field to a receptive medium in which apparatus a multiplicity of operations are carried out under various conditions, all of which are controlled by timers, relay controls and microswitches.

Further objects of my invention will be apparent from a consideration of the drawings, a specific description of which here follows.

Figure 4:
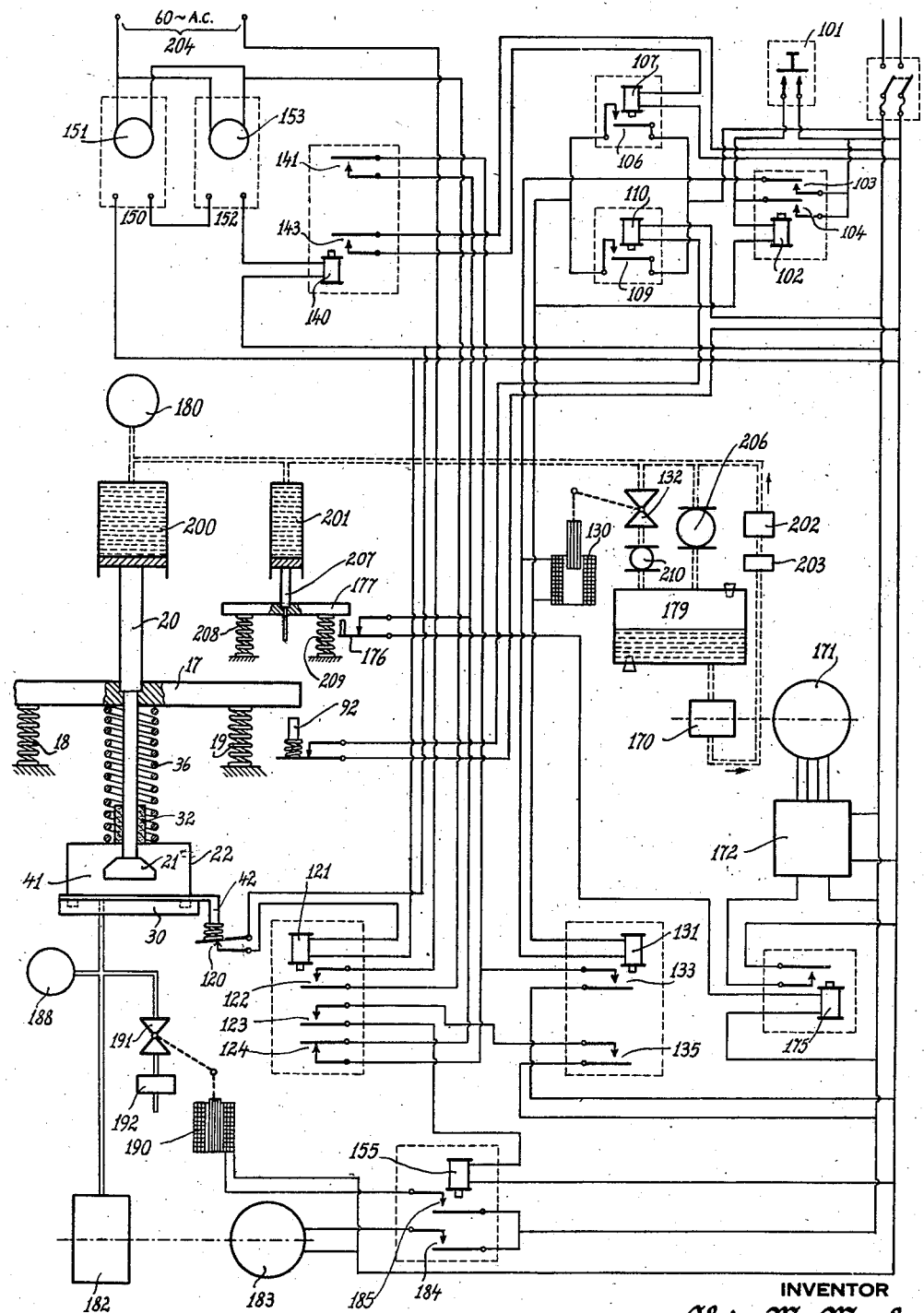
Figure 4 is a diagrammatic representation of the electrical controls and circuits showing their relation to various elements of my apparatus whereby the cycle of operations of my machine is automatically effected.
Figure 5:
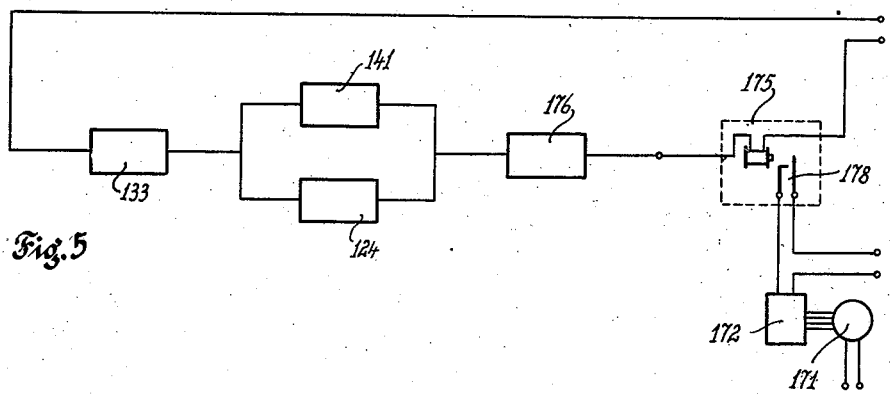
Figure 6:
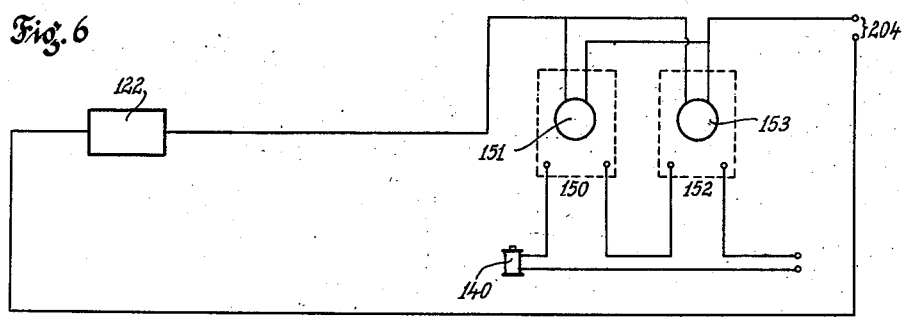
Figure 7:
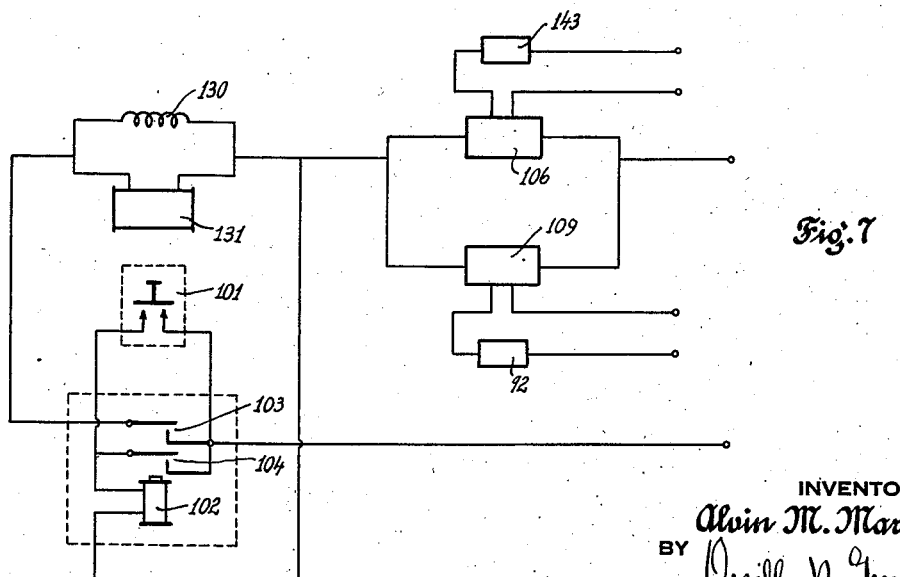

Figures 5, 6, and 7 are circuits which have been separated out from Figure 4 in order to make clear the separate functions and interrelations of the separate sections of the circuit.

Figure 5 is the motor control circuit.

Figure 6 is the timer control circuit.

Figure 7 is the holding circuit.

Figure 1:
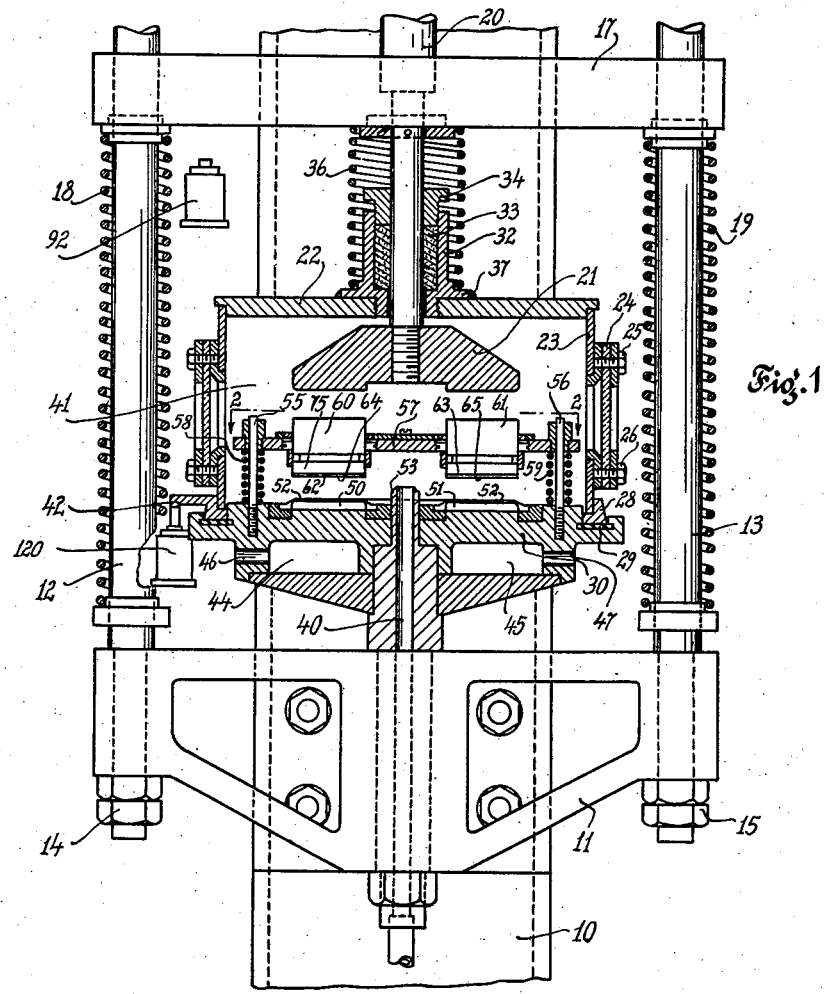
Figure 1 is a front view and partial cross section of the apparatus of my invention.

Referring now more specifically to the drawings, in Figure 1 I show my impresser apparatus mounted on a suitable standard 10. Fixed to this standard 10 is a heavy tension block 11 in which are positioned tension rods 12 and 13, the tension rods 12 and 13 being secured to the tension block 11 by suitable securing and locking means 14 and 15. Mounted on the tension rods 12 and 13 is a cross bar 17 which is resiliently forced upward by the coil springs 18 and 19 which fit around the tension rods 12 and 13. Fixed to the center of the arm 17 is a piston rod 20 which extends downwardly and at its lower terminus carries a pressure transmitting head 21. Yieldably carried on the piston rod 20 and the pressure transmitting head 21 is a vacuum hood 22. Positioned in the side wall 23 of the vacuum hood 22 is a window 24 fastened by suitable fastening means 25 and 26. The lower edge 28 of the sidewall 23 is adapted to be lowered into air tight engagement with the resilient gasket 29 seated in the platen generally denoted as 30.

The vacuum hood 22 rides freely on the piston rod 20 through the sleeve 32 which is sealed to preserve the vacuum in the hood 22 by the sleeve packing 33 and the screw cap packing gland 34 which exerts the proper pressure on the packing 33. A spring 36 exerts downward pressure on sleeve 32 at the lower seat thereof 37. The lower platen generally denoted as 30 is provided with a centrally located suction line 40 which communicates at one end with the operating chamber 41 and at the other end with a suitable source of vacuum such as a vacuum pump, not here shown.

In order to provide heat or cold according to the requirements of the operation the platen 30 has hollow passages 44 and 45 contained therein which passages communicate with a suitable source of steam or hot or cold fluid through pipe fittings 46 and 47. The heat transfer effected by such heating fluids raises or lowers the temperature of the platen 30 and thus also of the receptive plastic medium and the operating chamber 41.

Although I have here disclosed as a heating means, passages for the reception and transmission of fluids, it is within the purview of my invention to provide electrical resistance heating means or other suitable means for heating or cooling.

As previously pointed out the outer edge of the platen 30 is provided with a gasket 29 so that upon lowering of the vacuum hood 22 a sealed operating chamber 41 is obtained.

Seated in the platen 30 are removable backing surface plates 50 and 51 over which is adapted to be disposed a receptive plastic medium 52. The vacuum outlet 53 of the vacuum pipe 40 also functions as a positioning means. The plastic sheet 52 has a punched out central opening so that the sheet fits over the vacuum outlet. This receptive plastic medium may be in the form of cellulose acetate sheeting coated with a suitable resin or resinous mix that is thermoadhesive and therefore receptive to the crystalline layer which is to be transferred thereto.

Mounted and suitably fixed in the platen 30 are rods 55 and 56 on which are supported a riding carrier plate 57 by means of springs 58 and 59. Springs 58 and 59 yieldably support the carrier plate 57 a short distance above the backing members 50 and 51 thereby making it possible to apply a vacuum between the crystalline layers 64 and 65 of the master blanks 62 and 63 and upper surface of the receptive medium 52 before pressing these parts together. Loosely mounted in the carrier plate 57 are master blank holders 60 and 61 which carry affixed thereto the above-mentioned master blanks 62 and 63, on the lower face of which is deposited crystalline layers 64 and 65.

Figure 3:
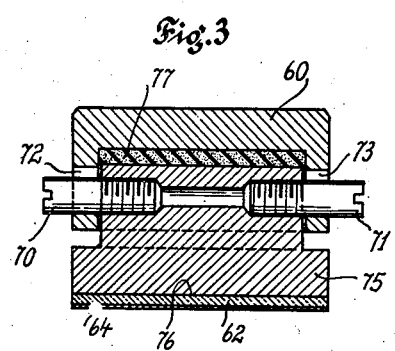
Figure 3 is an enlarged cross section of the master blank holder which is an element of my invention.

By referring now more specifically to Figure 3, it will be noted that this master blank holder 60 is affixed to the carrier member 57 by the extended pins 70 and 71. The extended pins 70 and 71 are loosely mounted in the master blank carrier 60, the openings 72 and 73 being vertically elongated slots. Master blank 62 is secured to the head 75 in some suitable manner as by means of an adhesive. The bottom surface 76 of the head 75 is an accurately flat surface. In order to provide an equally distributed pressure on the plurality of master blanks, a layer of resilient rubber 77 is provided between the master blank holder 60 and the head 75. A small clearance is provided between head 75 and the holder 60 so that a limited universal adjustment may occur to equally distribute the pressure applied through the rubber 77.

The sequence of steps in the operation of my apparatus is as follows:

Master blanks 62 and 63 which may be formed by depositing on a glass plate a crystalline layer of, for example, I. C. S.—a, as is described in my Patents Nos. 2,104,949 and 2,199,227, are affixed to the heads similar to 75 by means of suitable cement. A sheet of cellulose acetate 52 carrying a suitable receptive adhesive coating is dropped over the vacuum outlet and over the backing surfaces 50 and 51 which are seated in the platen 30. Upon actuation of the starting mechanism, downward pressure is supplied to the piston rod 20 which moves downwardly carrying the vacuum hood 22 towards the gasket 29 set in the platen 30. There are two sensitive snap switches, one of which 120 is operated when the gasket is compressed by the vacuum hood 22 and the second of which 92 is actuated when the crossbar 17 has moved down far enough to press the master blanks into the plastic sheet 52. Referring to Figure 4, the vacuum pump 182 is set in action and the solenoid air vent 191 is closed, when the switch 120 is actuated by the extension arm 42 on the hood 22, thereby withdrawing air from the operating chamber 41 through the vacuum line 40. The downward movement of the piston rod 20 is stopped until a suitable vacuum has been reached within the operating chamber 41, which may be on the order of one mm. of mercury. The vacuum hood 22 is resiliently maintained against the gasket 29 by the pressure exerted by the spring 36 against the vacuum hood at 37, the spring 36 being downwardly impelled by the crossbar 17, and also by the difference between atmospheric pressure and the lowered air pressure within the hood. As soon as the proper degree of vacuum has been effected within the operating chamber 41 the piston rod 20 again is impelled downwardly through the air tight seal 33 in the sleeve 32 whereupon the pressure head 21 moves downwardly and engages the master blank holders 60 and 61 moving said master blank holders 60 and 61 downwardly against the action of the relatively weak springs 58 and 59 and finally pressing crystalline layers 64 and 65 against the thermoadhesive coated cellulose acetate sheeting 52.

When pressure contact is established, a suitable degree of pressure is exerted for a proper predetermined period of time as set on a timing device which is a part of the electrical circuit to be described to effect the pressing of the layer of crystalline material on the master blank onto the receptive thermoadhesive coated cellulose acetate medium.

Figure 2:
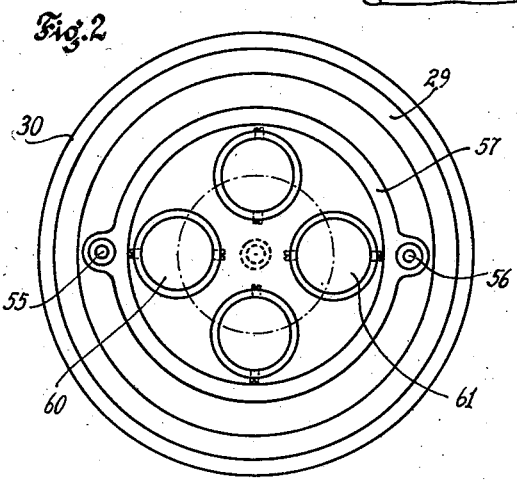
Figure 2 is a plan view taken along the line 2—2 of Figure 1.

Prior to and during the application of the pressure the temperature of platen 30 is raised by passing a heated fluid such as steam or hot water through the passages 44 and 45 in the platen 30. The heat applied is of sufficient degree to effect the softening of the thermoadhesive coating on the cellulose acetate sheet 52. As the piston rod 20 descends, full pressure being reached upon contact of the master blanks and the cellulose acetate sheet on the backing surface plates 50 and 51, the pressure is equally distributed among the master blank holders shown in Figure 2. By reason of the resilient member 77 between the blank holder 60 and the master blank head 75, an equal pressure on all master blank holders is assured as well as an equally distributed pressure over the entire area of the crystalline layer 64 and the plastic receptive medium into which it is pressing.

The mechanism is then released by the practically simultaneous release of the vacuum and the release of the pressure upon the piston rod 20 causing the springs 18 and 19 to move the crossbar 17 upwardly thus raising the vacuum hood 22 and the pressure head 21. Upon being so released the springs 58 and 59 raise the master blank carrier plate 57 upwardly carrying with it the master blank holders 60 and 61.

The master blanks which are in adhesive contact with the cellulose acetate sheeting 52 are then removed together with the master blank holders attached thereto. The cellulose acetate sheeting is then stripped from the master blank, this stripping effecting the cleavage of the crystalline layer on the master blank faces so that crystalline fields or layers remain attached to the cellulose acetate sheet, and to the master blank.

Then by a suitable method and apparatus which is more specifically described in my copending application Serial No. 331,937 and my Patent No. 2,199,227, I intensify the master blanks 62 and 63 and also the crystalline field which is affixed to the cellulose acetate sheeting 52, to complete the operation cycle.

I have provided for automatically effectuating the above described sequence of operations by means of switches located on the apparatus of my invention, these switches being actuated by predetermined movements of the apparatus, these switches cooperating with electric timer mechanisms and relay circuits interacting with a motor for the oil pressure pump and a motor to the vacuum pump and also the solenoid valves in the vacuum and oil pressure system, the action of which is timed in accordance with a predetermined cycle.

The cycle of operations is initiated by an operator pushing a momentary push button through contact 101 which energizes the relay coil 102. Energizing the relay coil 102 closes the contacts 103 and 104 which contacts remain closed, contact 104 acting to maintain or hold the circuit until the current therethrough is interrupted. (See Figures 4 and 7)

Relay coil 102 is in series with a parallel circuit consisting of a single set of contacts 108 actuated by relay coil 107, and single set of contacts 109, actuated by a relay coil 110, both 109 and 108 being normally open.

The switch 92 which is positioned at the point of farthest downward travel of the cross bar 17 is normally closed and in this closed position it energizes the coil 110 which in turn closes the relay switch 109.

The relay switches 103 and 104 are normally open and when closed the switch 104 holds the circuit while the switch 103 simultaneously actuates the solenoid oil valve 130 and the relay coil 131 which are in parallel. Hence the closing of the switch 103 closes the contacts 133, and 135 of the relay 131 and also simultaneously closes the solenoid oil valve 130. It is to be understood that the circuit shown in Figure 7 is closed during the operation of the cycle steps above set forth and the closed circuit is maintained because the relay 106 is closed before the relay 109 is opened.

This rerouting will be explained later at the time of its occurrence.

Referring now to Figure 5, contact 133 on relay 131 has been closed as previously explained. Contact 141 as yet is open since the timers 151 and 153 have not yet been actuated. However, contact 124 on relay 121 is normally closed and consequently the circuit through relay 175 is completed inasmuch as the accumulator switch 176 is also closed. The accumulator switch 176 is normally closed and opens only when pressure in the accumulator rises to some preset value. Thus 176 in conjunction with accumulator arm 177 acts like a pressure stat.

Returning now to relay coil 175, contact 178 is closed by the energizing of relay coil 175. The closing of 178 actuates the remote control starter 172 which starts the motor 171, the starter 172 being of a conventional type.

Referring now to Figure 4 solenoid 130 has been closed by the energization of circuit as shown in Figure 7, thus closing the solenoid oil valve 132. Motor 171 driving pump 170 forces oil from reservoir 179 into the main cylinder 200 and into accumulator cylinder 201. Raising the pressure of the oil in 200 causes the downward travel of piston 20 against the springs 18 and 19 which carries downward the crossbar 17 and vacuum hood 22 which contacts the gasket 29 and simultaneously by means of extension 42 closes switch 120.

Closing switch 120 energizes relay coil 121 which thereby makes contacts 122 and 123 and breaks contact 124. The breaking of 124 de-energizes relay 175 thus stopping motor 171 and stopping oil pump 170. Check valve 202 prevents the oil in cylinders 200 and 201 from backing up into the reservoir 179. Consequently pressure head 21 stops in its downward travel and remains motionless at this stage of the operation.

Simultaneously the closing of contact 123 energizes relay coil 155 through contact 135 which has previously been closed by the relay coil 131, relay coil 131 having been energized at the outset of the cycle by the holding coil circuit of Figure 7. Energizing coil 155 simultaneously closes contact 184 and 185. Contact 184 starts vacuum pump motor 183 thus causing vacuum pump 182 to exhaust operating chamber 41. Contact 185 energizes solenoid 190 which closes air valve to the atmosphere 191. 192 is an air filter which prevents dust from entering the system. Vacuum gauge 188 indicates pressure within operating chamber 41. With any given rate of pumping there is a pressure-time relationship with a fixed exhaust volume as contained in operating chamber 41. Consequently there will be a definite time period necessary for exhausting chamber 41 to the desired preset pressure. The time period can be set on timer 151. Alternatively, 188 and 151 could be replaced by a vacuum pressure stat which would operate switch contacts 150 directly.

Simultaneously the energizing of coil 121 closes contact 122. Referring to Figure 6, the closing of contact 122 completes the circuit, thus actuating timer motors 151 and 153 by a time-monitored A. C. source 204.

Timers 151 and 153 are conventionally known as reset timers or time delay switches. Timer 151 operates as follows:

Upon 151 being energized, switch 150 which is normally open, closes after a time preset on the dial of timer 151. Switch 150 remains closed until the current through timer 151 is interrupted whereupon the timer automatically resets and is prepared to repeat this operation upon re-energizing.

Timer 153 operates similarly except that its contacts 152 are normally closed, and open after a time that is preset on dial of timer 153, the timer resetting upon de-energizing of the timer motor 153.

Since switches 150 and 152 are in series, if time $t_1$ is set on dial 151 and time $t_2$ is set on dial 153, the series circuit will be open for time $t_1$, then closed for time $t_2-t_1$ and thereafter opened, this sequence repeating upon the de-energizing and then re-energizing of the timer motors 151 and 153 which are in parallel.

Returning to the sequence of operations occurring in the apparatus shown in Figure 1, the closing of switch 120 stops the pressure head 21 and causes a vacuum to be established in operating chamber 41, thereby removing the air between crystalline layers 64 and 65 and the surface of the plastic 52. This permits the establishment of a perfect contact between the surfaces without the interference of atmospheric pressure which would be manifested by bubble formation and consequent loss of contact at the bubbles.

Upon the closing of switch 120 the timers 151 and 153 are started by the closing of the circuit through 122 and 134 which have been closed as above-described.

When the time $t_1$ which has been set on 151 has expired, the time being measured from closing of 120 through the interval necessary to establish the proper vacuum, contact switch 150 is closed thereby establishing circuit through 152 which is normally closed and consequently energizing relay coil 140, simultaneously closing contacts 141 and 143.

Referring back to the motor control circuit of Figure 5, it is noted that contact 133 is still closed, contact 124 having been opened by closing of switch 120. Now, however, the timers have closed 141 thereby temporarily actuating the oil pump 170. The effect is to continue the downward motion of pressure head 21 which engages the master blank holders 60 and 61 and presses the crystal layers 64 and 65 into pressure contact with the plastic medium 52.

There is provided in the oil system a pressure relief valve 206 which prevents the pressure in the system from exceeding a predetermined maximum pressure necessary for the pressing operation. I have also provided an accumulator 201 which stores up pressure to maintain a constant pressure in the cylinder 200. The accumulator 201 also acts as a pressure-stat by causing the piston to open and close switch 176 as the pressure within the system becomes too high or too low respectively. It can be seen from Figure 5 that 176 alone controls operation of oil pump 170, other elements in this circuit being closed. The pressure for downward movement before pressure contact being low and rising very suddenly as contact between master blanks and receptive plastic medium is established, the functions of the accumulator are important in that it causes the pressure in the system to increase at a controlled rate. The accumulator therefore acts as a pressure cushion and reservoir. It also accommodates for any leakage in the system.

Simultaneously with pressure contact of the master blank and the cellulose acetate, the downward movement of piston 20 causes the opening of switch 92 which de-energizes relay coil 110 thus opening switch 109. Referring now to Figure 7, the circuit through 150 and 152 has energized coil 140 closing contact 143, thereby energizing relay coil 107 and closing contact 106. Consequently the current through holding coil 102 has been rerouted through switch 106 before contact 109 is opened by actuation of switch 92.

The crystalline layers 64 and 65 are now being pressed into plastic layer 52 for a time $t_2-t_1$ and the heat from chamber 45 softens the thermoadhesive coating on the upper surface of the cellulose acetate sheet 52 therefore firmly bonding the outer portion of the crystalline layer 64 and 65.

At the end of the predetermined time interval $t_2-t_1$ during which this impressing operation is taking place, the switch 152 of timer 153 opens thereby de-energizing relay coil 140 and simultaneously opening contacts 141, and 143. The opening of contact 143 de-energizes relay 107 breaking switch 108 thereby de-energizing the holding coil 102 causing contact 103 to open. The opening of 103 de-energizes electromagnet 130 and also de-energizes coil 131 thereby breaking contacts 133 and 135. The opening of oil valve 132 caused by the de-energizing of 130 enables the oil in the cylinders 200 and 201 to empty into 179, the pistons 20 and 207 moving upwardly under pressure from springs 18 and 19 and 208 and 209 respectively.

The opening of 135 de-energizes relay coil 155, thereby stopping vacuum pump 182 and opening air valve 191 to the atmosphere, thereby enabling the pressure within operating chamber 41 to return to atmospheric pressure.

The piston 20 moving upwardly under impulse springs 18 and 19 carries vacuum hood 22 up thereby opening switch 120 consequently opening contacts 122 and 123 and closing contact 124.

As shown in Figure 6 contact 122 upon opening de-energizes timers 151 and 153 which reset for the next cycle.

To prevent the excessive emptying of cylinder 200 and 201 when valve 132 is opened, a low pressure-relief valve 210 is provided in the system between the oil valve 132 and the reservoir 179. The function of the relief valve 210 is to prevent oil under pressure less than a given limit to pass through the valve from the cylinders to the reservoir 179. Thus the cylinders are not completely emptied upon the opening of the valve 132, they are merely emptied to a sufficient extent to permit the return of the piston to a starting position. Thus when starting the cycle anew, no undue period is required for building up pressure in the cylinders.

From the cycle of operations and the controls therefor which have been described above, it can be seen that, after the coated cellulose acetate has been placed over the backing surface plates 50 and 51 and the carrier plate 57 carrying the master blanks is placed upon the supporting springs 58 and 59, the operator initiates the cycle of operations by means of a push button 101 causing the proper sequence of conditions and operations to be carried out automatically. Upon the end of the cycle the master blanks with the cellulose acetate sheet 52 attached thereto can be removed from the apparatus for separation.

It is particularly important that the backing surface plates 50 and 51 and the face of the head 75 be accurately flat in order to insure a complete and equally distributed pressure on the crystal layers and plastic medium. By means of the loose mounting of the master blanks 62 in the carrier members 60 within the carrier plate 57, I compensate for any unequal pressures that might be set up. This is important because it is a primary object of this apparatus to insure an even flat contact between the crystalline layers and the plastic medium in order to obtain a complete contact therebetween for effective transfer.

By resiliently or yieldably supporting the carrier plate 57 with the master blank holders loosely mounted therein above the backing surface plate 50, the vacuum which is set up in the operating chamber 41 can be effectively utilized. The vacuum outlet 53 serves not only as a means for evacuating the chamber 41 but also as a means for accurately positioning the plastic medium 52 which may be in the form of a coated sheet of cellulose acetate with an opening punched out to correspond with the outlet 53.

It is within the purview of my invention to modify my apparatus in certain respects, as for example by yieldably supporting the carrier plate 57 on the piston rod 28 or on the pressure head 21. It is also within the scope of my invention to supply heat to the operating chamber and to the materials to be heated by means of radiant heat or conducted heat at any proper point within the chamber.

The cellulose acetate sheeting 52 which I have termed the receptive plastic medium is coated with a lacquer that is thermoadhesive. The crystal from the master blanks 64 and 66 is embedded in this adhesive lacquer and remains adhesively attached thereto after the cellulose acetate film 52 is stripped from the master blanks.

It is of great importance that this lacquer which coats the cellulose acetate film be of sufficient thickness so that upon contact between this lacquer and the crystal layer a molding effect is obtained in the sense that the adhesive lacquer can be molded and compressed in particular areas to compensate for slight differences to obtain the exact flat contact between the backing surface 50 and the cellulose acetate sheeting and the master blank surface. In other words because there are always as a practical matter slight irregularities in either the backing surface itself or the crystal layer of the master blank, or slight differentials in thickness in the cellulose acetate sheeting, it is necessary in order to obtain as close to a planular contact as possible that there be a compensating factor and in this case the compensation is provided for in the thermoplastic coating. I have found that good results are obtained with a coating on the order of .002 to .003 of an inch in thickness. With too thin a coating, that is a coating substantially thinner than that set forth above, the customary irregularities in either the backing surface or the acetate film or the crystal layer cause poor contact between the coated acetate and the master blank crystal.

The effective temperature of lamination must be high enough to cause flow in the coating lacquer with the pressure employed. I have found that under certain conditions set forth below an effective temperature, that is a temperature at the backing plate and hence a temperature which is directly transmitted to the parts to be united, should be on the order of from 224 to 234 degrees Fahrenheit.

A desirable pressure is on the order of 2580 pounds per square inch. The above temperature and pressure are particularly effective when, on a cellulose acetate film of .005 inch thickness, the following coating is employed:

*Formula A*

| | | |
|---|---|---|
| Nitrocellulose (½ sec. viscosity — 50% solids) | c. c. | 240 |
| Polyvinyl acetate | gms. | 80 |
| Butyl acetate | c. c. | 720 |

This coating composition is flowed on to one surface of the surface of the cellulose acetate and allowed to dry.

As will be obvious to those skilled in the art, the temperature conditions vary with the composition of the thermoadhesive coating and the plastic support depending primarily upon the plasticizer content and the thermo plastic nature of the coating. The important principle of which the above specific description is illustrative is that the coating on the plastic support be moldable and be of sufficient thickness so that slight irregularities in the crystal layer of the master blank or in the backing plate or in the plastic support (such as the cellulose acetate film) may be compensated for, and a perfect contact obtained. When perfect flat contact is obtained between the crystal layer and the adhesive coating, and adequate heat transfer is effected, a uniform and complete transfer may be effected of the crystal layer on to the adhesive coating.

It is important, of course, that the temperature employed be not sufficiently high to cause flow in the plastic support which in this case is a cellulose acetate film, since if such a temperature be employed the backing film will flow and the result is a distorted film characterized by an excess flow around the edge and strain areas which are visible under polarized light.

It is possible to obtain effective transfer with a low operating temperature on the order of 180° F., and with thin film coatings, but under such conditions a longer time of pressing is necessary and often repeated pressings are required. Thus at 180° F., with a surface coating thinner than .002 of an inch, as above specified, a fifty second pressing is required and ordinarily this pressing must be repeated.

The use of the thicker layer of thermoadhesive coating on the plastic support also eliminates certain problems in connection with dust or dirt. When such a thicker coating, as I have set forth, is employed, upon the flow of the plastic coating under heat and pressure, the particles of dust or dirt are surrounded completely and hence their optical effect is minimized.

I have found that when using the thermoadhesive coating above described of a thickness on the order of .002 to .003 of an inch, that at 234° F. a seventeen second pressing time is adequate, while with an oil film on the backing surface a three second pressing time is satisfactory.

Accordingly, in order to obtain flat and uniform contact and an optimum transfer of crystalline layer, I prefer to employ a thermoadhesive coating on the order of .002 to .003 inch in thickness on the plastic film to which the crystalline layer is to be transferred.

When proper heat and pressures are employed to press the crystalline film into the thermoadhesive coating with a molding effect, I obtain not only a very satisfactory transfer but also the extremely small particles of dust or dirt that may be present under usual atmospheric operating conditions are so encompassed by the plastic as to be substantially invisible in the finished product.

I have found it of great importance to have a substantially planular crystalline surface when there is a difference between the index of refraction of the crystal layer and the thermoadhesive coating. Best results are obtained when the crystalline layer on the master blank is thin and has a planular outer surface which has been intensified under controlled conditions before each transfer.

The temperature and air flow surrounding the intensification must be controlled to prevent an excess air velocity, since such excess air velocity causes too rapid a drying of the intensification solution and thus does not give enough time for the lateral crystal growth to close up the crystal mesh which has been stripped off the master blank. Too rapid a drying also accentuates the irregularities of the crystal surface.

Accordingly, I prefer to employ a coating lacquer, that is, a thermoadhesive coating that has an index of refraction substantially equal to that of the crystalline layer. In addition the master blank should be intensified under controlled conditions before transfer is effected of the crystal layer of the master blank on to a support.

I have found that in order to transfer heat from the heated backing plate to the adhesive coating on the cellulose acetate film that it may be desirable to employ on the back of the acetate film or on the metal backing surface, a film of liquid adapted to transfer heat, such as a film of oil. When a thin film of oil is applied on to the back of the cellulose acetate film, it facilitates the conduction of heat from the heated backing member to the thermo-adhesive coating on the cellulose acetate film and thus the coating is properly softened to receive the crystalline film to be transferred thereto. This is of particular importance since the pressing operation is carried out in vacuum and even a thin vacuum spacing between the flat plate and the plastic film inhibits the transfer of heat except by radiation.

With the use of an oil film, a thinner and more uniform thermoadhesive coating may be employed. Thus in lieu of the 720 c. c. butyl acetate solvent of the Formula A, I may use as high as 2500 c. c. of butyl acetate and a lower backing surface temperature, e. g. on the order of 180° to 190° F.

It is necessary to create such a temperature and pressure condition that the thermo-adhesive coating will flow and become receptive to the crystalline field but the plastic support such as cellulose acetate will not flow. In other words, the thermo-adhesive coating becomes moldable and is molded by the impression of the crystalline field thereon.

It is within the purview of my invention to eliminate the use of this thermo-adhesive coating and employ a plastic support under such conditions of temperature and pressure that the plastic support can receive and retain the crystalline field which is molded thereinto. I can, for example, impress the crystalline field directly on the cellulose acetate of the conventional commercial type at a temperature of 260° F.

When a thermo-adhesive coating is employed on the plastic support, certain solvent characteristics of the components should be observed. The solvent of the thermo-adhesive lacquer which coats the plastic support and is adapted to receive the crystalline field must not be a solvent of the material that comprises the support. Specifically I prefer to employ as a solvent of my thermo-adhesive coating or lacquer butylacetate, cellulose acetate being sufficiently insoluble in butyl acetate. Over the crystalline field which is embedded in the thermo-adhesive coating I apply a coating lacquer and the solvent of this coating lacquer must not be a solvent for the thermo-adhesive coating on the support. The index of refraction of the coating lacquer should be as close as possible to the index of refraction of the crystalline field and preferably should substantially approximate it, for maximum optical clarity.

The specific phenomenon of crystal growth and crystal transfer are fully set forth in my copending applications Serial No. 313,392 and Serial No. 331,937 of which the present application is a continuation-in-part.

I claim:

1. An impresser mechanism comprising a pressure transmitting head, means for impelling said pressure transmitting head, a platen and a carrier plate yieldably supported between said pressure transmitting head and said platen, and a master blank holder mounted in said carrier plate.

2. An impresser mechanism comprising a piston rod, a pressure transmitting head mounted on said piston rod, a vacuum hood mounted on said piston rod and disposed over said pressure transmitting head, a platen and means for resiliently pressing said vacuum hood against said platen.

3. An impresser mechanism comprising a frame, two tension rods mounted on said frame, a crossbar on said two tension rods, springs disposed over said tension rods and supporting said crossbar, a piston rod, said piston rod engaging said crossbar, a pressure transmitting head mounted on said piston rod, a vacuum hood slidably mounted on said piston rod in air tight contact therewith.

4. An apparatus comprising a base, a hood, means for moving said hood into sealing engagement with said base to form a vacuum chamber, means for evacuating said vacuum chamber, said means for evacuating said vacuum chamber being actuated immediately after said hood moves into sealing contact with said base, a pressure element adapted to perform a pressing operation located within said hood, means for causing said pressure element to be actuated after a predetermined condition of vacuum is established within said vacuum chamber, said means for causing the pressure element to be actuated including a time control element, means for breaking the vacuum in the vacuum chamber after the pressure element has performed its operation, and means for retracting said pressure element and said hood from said base.

5. An apparatus comprising a base, a hood, means for moving said hood into sealing engagement with said base to form a vacuum chamber, means for evacuating said vacuum chamber, said means for evacuating said vacuum chamber being actuated by a contact control immediately after said hood moves into sealing contact with said base, a pressure element adapted to perform a pressing operation located within said hood, means for causing said pressure element to be actuated after a predetermined condition of vacuum is established within said vacuum chamber, said means for causing the pressure element to be actuated including a time control element, means for breaking the vacuum in the vacuum chamber after the pressure element has performed its operation, and means for retracting said pressure element and said hood from said base, said means for retracting comprising a spring mechanism.

6. An apparatus comprising a base, a hood, means for moving said hood into sealing engagement with said base to form a vacuum chamber, means for evacuating said vacuum chamber, said means for evacuating said vacuum chamber being actuated immediately after said hood moves into sealing contact with said base, a pressure element adapted to perform a pressing operation located within said hood, means for suspending work to be operated on between said pressure element and said base, means for causing said pressure element to be actuated after a predetermined condition of vacuum is established within said vacuum chamber so that said work is pressed by said pressure element against said base, said means for causing the pressure element to be actuated including a time control element, means for breaking the vacuum in the vacuum chamber after the pressure element has performed its operation, and means for retracting said pressure element and said hood from said base.

7. An apparatus for the transfer of a crystalline field to a receptive medium comprising a base, a hood, means for moving said hood into sealing engagement with said base to form a vacuum chamber, means for evacuating said vacuum chamber, said means for evacuating said vacuum chamber being actuated immediately after said hood moves into sealing contact with said base, a pressure element adapted to perform a pressing operation located within said hood, a master blank holder holding a master blank having a crystalline field on its face suspended between the pressure element and the base, said master blank holder being positioned between said pressure element and said base so as to be pressed by said pressure element toward said base thus transferring the crystalline field on the master blank to a receptive medium positioned on said base, means for causing said pressure element to be actuated after a predetermined condition of vacuum is established within said vacuum chamber, said means for causing the pressure element to be actuated including a time control element, means for breaking the vacuum in the vacuum chamber after the pressure element has performed its operation, means for retracting said pressure element and said hood from said base.

ALVIN M. MARKS.